United States Patent
Jiang (10) Patent No.: US 7,411,979 B2
(45) Date of Patent: Aug. 12, 2008

(54) ENHANCED SDU DISCARD PROCEDURE FOR A SPECIAL DATA SEGMENTATION IN A WIRELESS COMMUNICATIONS SYSTEM

(75) Inventor: Sam Shiaw-Shiang Jiang, Taipei (TW)

(73) Assignee: Innovative Sonic Limited, Tortola (VG)

( * ) Notice: Subject to any disclaimer, the term of this patent is extended or adjusted under 35 U.S.C. 154(b) by 582 days.

(21) Appl. No.: 11/160,684

(22) Filed: Jul. 5, 2005

(65) Prior Publication Data

US 2006/0077892 A1   Apr. 13, 2006

Related U.S. Application Data

(60) Provisional application No. 60/522,398, filed on Sep. 24, 2004.

(51) Int. Cl.
   *H04J 3/26* (2006.01)
(52) U.S. Cl. ........................... 370/469; 370/474
(58) Field of Classification Search ............ 370/469, 370/470, 474
   See application file for complete search history.

(56) References Cited

U.S. PATENT DOCUMENTS

| | | | |
|---|---|---|---|
| 6,922,393 | B2 | 7/2005 | Jiang et al. |
| 7,295,573 | B2 * | 11/2007 | Yi et al. ............ 370/469 |
| 2003/0147396 | A1 | 8/2003 | Jiang |
| 2004/0009771 | A1 * | 1/2004 | Leppanen et al. ...... 455/426.2 |
| 2004/0160937 | A1 | 8/2004 | Jiang |
| 2007/0047582 | A1 * | 3/2007 | Malkamaki ............ 370/470 |

FOREIGN PATENT DOCUMENTS

EP   1 333 609 A1   8/2003

OTHER PUBLICATIONS

U.S. Appl. No. 10/705,356.
U.S. Appl. No. 10/918,486.
3rd Generation Partnership Project, Technical Specification Group Radio Access Network; Radio Link Control (RLC) protocol specification (Release 6), 3GPP TS 25.322 V6.1.0 (Jun. 2004), 3GPP, pp. 1-78.
"Universal Mobile Telecommunications System (UMTS); Radeo Link Control (RLC) protocol specification.", 3GPP TS 25.322, ETSI TS 125 322, XP-002343868, Jun. 2004, pp. 1-79, vol. 6.1.0.
"Universal Mobile Telecommunications System (UMTS); Radeo Link Control (RLC) protocol specification.", 3GPP TS 25.322, ETSI TS 125 322, XP-014016811, Jun. 2004, pp. 1-79, vol. 6.1.0.

* cited by examiner

*Primary Examiner*—Melvin Marcelo
(74) *Attorney, Agent, or Firm*—Birch Stewart Kolasch & Birch, LLP (57) ABSTRACT

A method for handling discarding of a sequence of service data units in a communications system is disclosed. The sequence of service data units includes at least a last discarded service data unit (SDU). When a protocol data unit (PDU) containing a length indicator of the last discarded SDU contains no new SDUs, the method includes creating a move receiving window super field (MRW SUFI), setting a $N_{LENGTH}$ field of the MRW SUFI to 0, setting a last sequence number move receiving window field ($SN\_MRW_{LENGTH}$) to a sum of one plus a sequence number (SN) of the PDU containing the length indicator of the last discarded SDU, and issuing the MRW SUFI.

14 Claims, 8 Drawing Sheets

ENHANCED SDU DISCARD PROCEDURE FOR A SPECIAL DATA SEGMENTATION IN A WIRELESS COMMUNICATIONS SYSTEM

CROSS REFERENCE TO RELATED APPLICATIONS

This application claims the benefit of the filing date of U.S. provisional patent application No. 60/522,398, filed Sep. 24, 2004, the contents of which are hereby incorporated by reference.

BACKGROUND OF THE INVENTION

1. Field of the Invention

The present invention relates to a wireless communications system, and more particularly to a method for discarding data segments in a wireless communications system.

2. Description of the Prior Art

New uses are constantly being found for wireless communications. Initially limited to voice communications, packetized data has opened the field to cellular modems, camera phones, fixed-wireless transceivers for high-speed networking, and myriad other uses. The field is growing rapidly and requires sophisticated protocols to handle the increasing amount of data being transmitted. The Universal Mobile Telecommunications System (UMTS) specified by the $3^{rd}$ Generation Partnership Project (3GPP™) is an example of such a new communications protocol. The $3^{rd}$ Generation Partnership Project (3GPP) specification, TS 25.322 V6.1.0 (2004-06) Radio Link Control (RLC) protocol specification (referred to hereinafter as 3GPP TS 25.322), included herein by reference, provides a technical description of data transmission control protocols thereof. UMTS utilizes a three-layer approach to communications. The three-layer protocol has a first layer, the physical transport layer; a second layer, where data is packetized, collated, and organized; and a third layer, which interfaces between the second layer and applications generating or using the data.

The packetization and collation processes are designed to handle missing data segments, due to noise in transmission or other errors, by triggering a retransmission procedure. When a collation cannot be fulfilled by the retransmission procedure due to a protocol error, a reset procedure may be initiated to recover the transmission from the protocol error. The reset procedure can cause large delays as all the state variables are reset and the transmission entity is started over from the beginning. These problems occur primarily in the second (packet control) layers.

Figure 1:
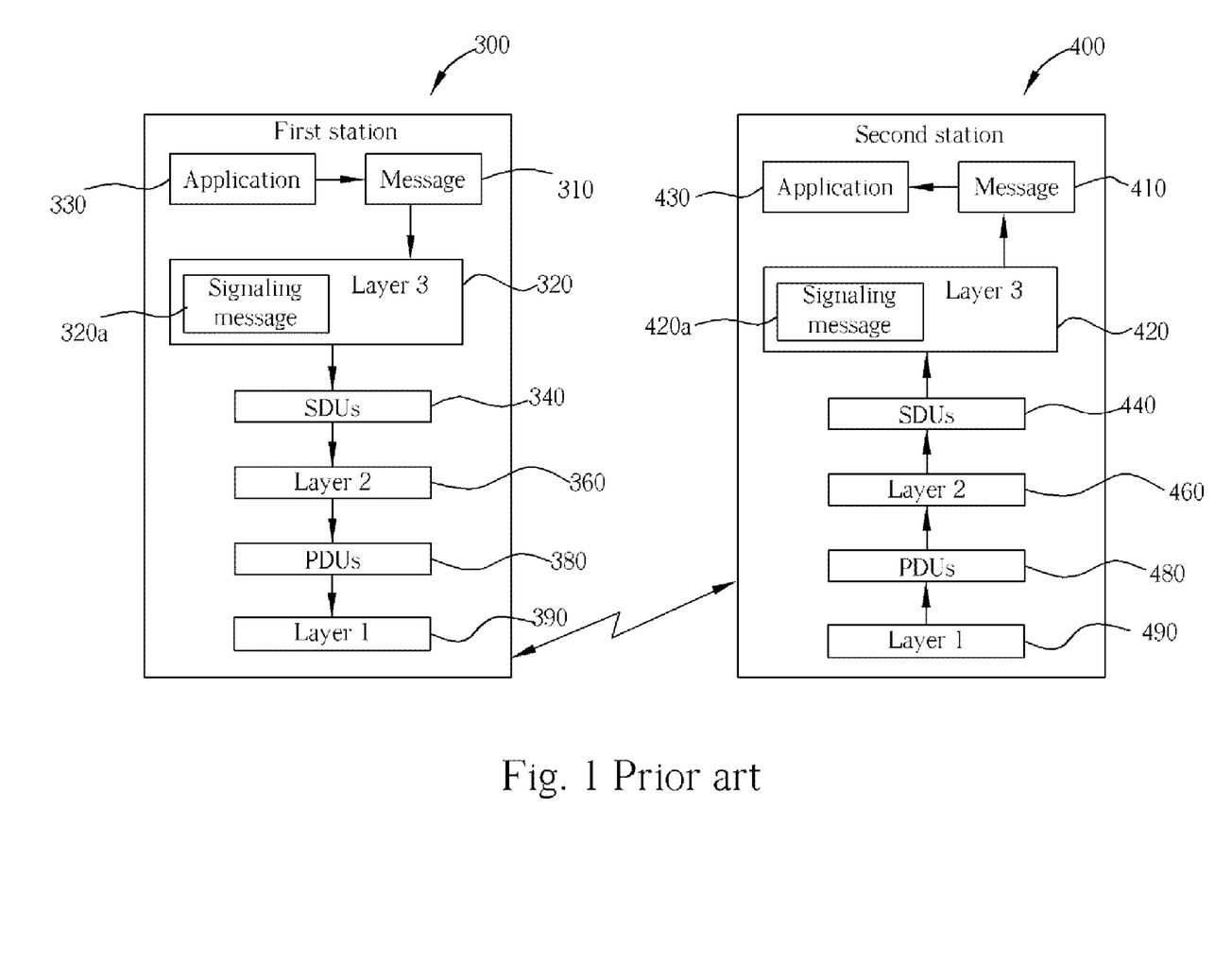
FIG. 1 is a diagram showing an overview of the layers and communications between a first station and a second station.

Please refer to FIG. 1, a block diagram of the three layers in such a communications protocol. In a typical wireless environment, a first station 300 is in wireless communication with one or more second stations 400. An application 330 on the first station 300 composes a message 310 and has it delivered to the second station 400 by handing the message 310 to a third layer interface 320. The third layer interface 320 may also generate some third layer signaling messages 320a for the purpose of controlling third layer operations. The third layer interface 320 delivers either the message 310 or the third layer signaling message 320a to a second layer interface 360 in the form of second layer service data units (SDUs) 340. The second layer SDUs 340 may be of any length. The second layer interface 360 composes the SDUs 340 into one or more second layer protocol data unit(s) (PDU) 380. Each second layer PDU 380 is of a fixed length, and is delivered to a first layer interface 390. Note that the fact that variable length SDUs are transported in fixed length PDUs generates issues that are highly relevant to the present invention, and these issues are discussed in more detail below. The first layer interface 390 is the physical layer, transmitting data to the second station 400. The transmitted data is received by the first layer interface 490 of the second station 400 and reconstructed into one or more PDUs 480, which is/are passed up to the second layer interface 460. The second layer interface 460 receives the PDU(s) 480 and builds up one or more second layer SDU(s) 440 from the PDU(s) 480. The second layer SDU(s) 440 is/are passed up to the third layer interface 420. The third layer interface 420, in turn, converts the second layer SDU(s) 440 back into either a message 410, which should be identical to the original message 310 that was generated by the application 330 on the first station 300, or a third layer signaling message 420a, which should be identical to the original signaling message 320a generated by the third layer interface 320, and which is then processed by the third layer interface 420. The received message 410 is passed up to an application 430 on the second station 400.

In order to detect missing data, the protocol relies on the collation of PDUs in the second station's 400 second layer 420 to notice that a PDU has not been received and to send a request for retransmission through the first layer 490 to the first layer 390 of the first station 300.

Figure 5:
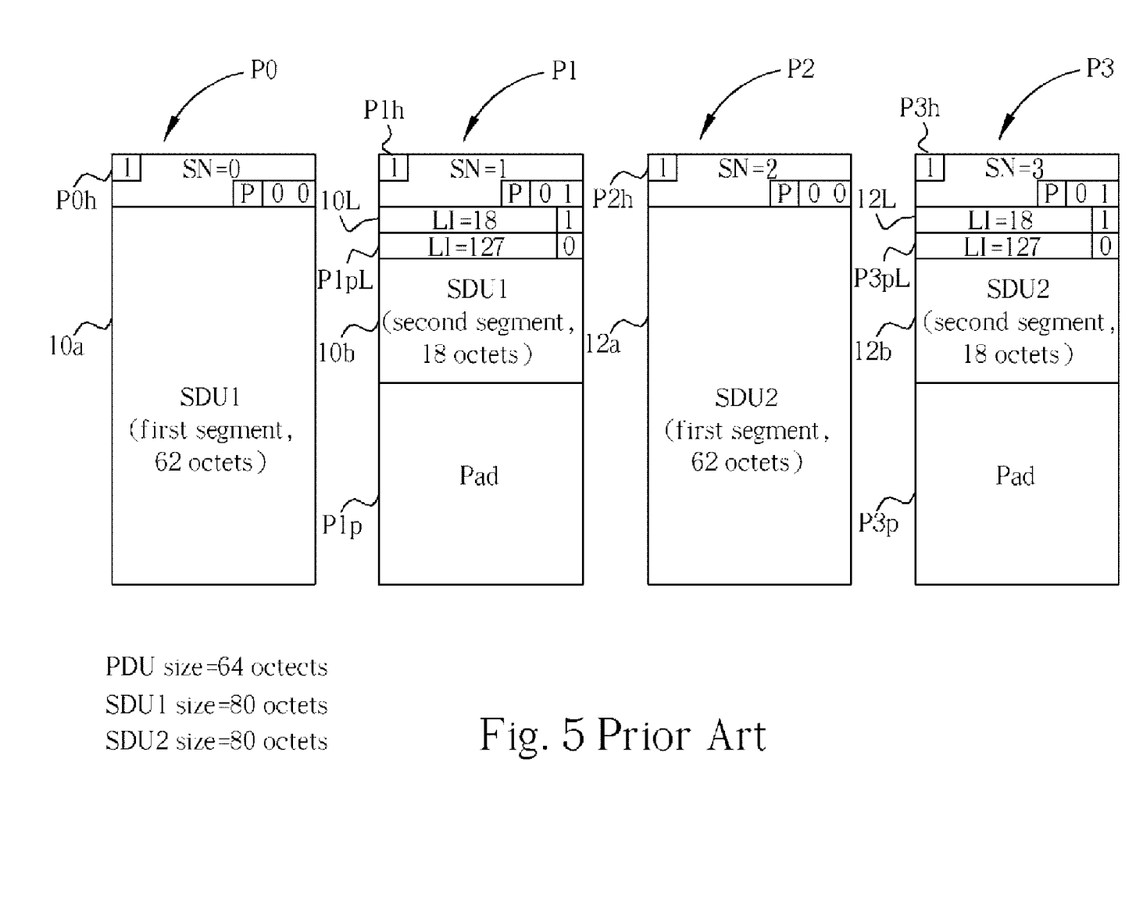
FIG. 5 is a data block diagram showing a typical segmentation of SDUs where no concatenation is used.

Please refer to FIG. 5, which illustrates a typical sequence of PDUs containing SDUs. In this example, two SDUs, SDU1 and SDU2, each of length 80 octets, are packetized into four PDUs P0, P1, P2, P3 each of length 64 octets. Each PDU contains a header, respectively P0h, P1h, P2h, P3h, which is two octets long, leaving 62 octets for the contents of the PDUs. Each header contains, among other data, a sequence number (SN), which increases sequentially in each PDU transmitted, and a flag indicating whether or not the PDU has a length indicator (LI), which indicates the position of the last byte of data of a SDU. The flag is located at the last bit of the header. If the flag is set to 1, then the PDU contains a LI structure of one octet, with the first seven bits indicating the length of the data to which it refers and the eighth bit being a flag indicating whether this is the last LI in the PDU. PDU P0 has the SN of zero (0), and the flag indicates that there is no LI. The data 10a is thus entirely from a single SDU. PDU P1 has SN equal to 1, and its flag set to 1 indicates that the next octet is a LI structure, which contains a LI field and a one-bit flag. The first LI field 10L has a value of eighteen (18) followed by a flag indicating another LI structure to follow; PDU P1 then has a second LI field P1pL with a value of 127 (all 1's for the 7 bits of the second LI) followed by a flag set to 0 indicating that the second LI is the last LI in the PDU. The first eighteen data bytes of this PDU, following the two LI structures, are the remainder of the data 10b for SDU1. The special value (127) of the second LI indicates that the rest part of the PDU P1p is a padding, which is padded with arbitrary value to keep the length of the PDU P1 fixed and shall be neglected. PDU P2 has the SN of 2, and the flag indicates that there is no LI. The data 12a is thus entirely for a single SDU. Similarly, PDU P3 has SN of 3, and its flag set to 1 indicates that it contains a LI structure. The LI 12L has a value of 18 and a flag indicating a second LI structure follows; PDU P3 then has an LI field P3pL with a value of 127 followed by a flag set to 0. Thus, the first eighteen data bytes of this PDU 12b, following the two LI structures, are the remainder of the data 10b for SDU2. The rest part P3p is padding.

Figure 6:
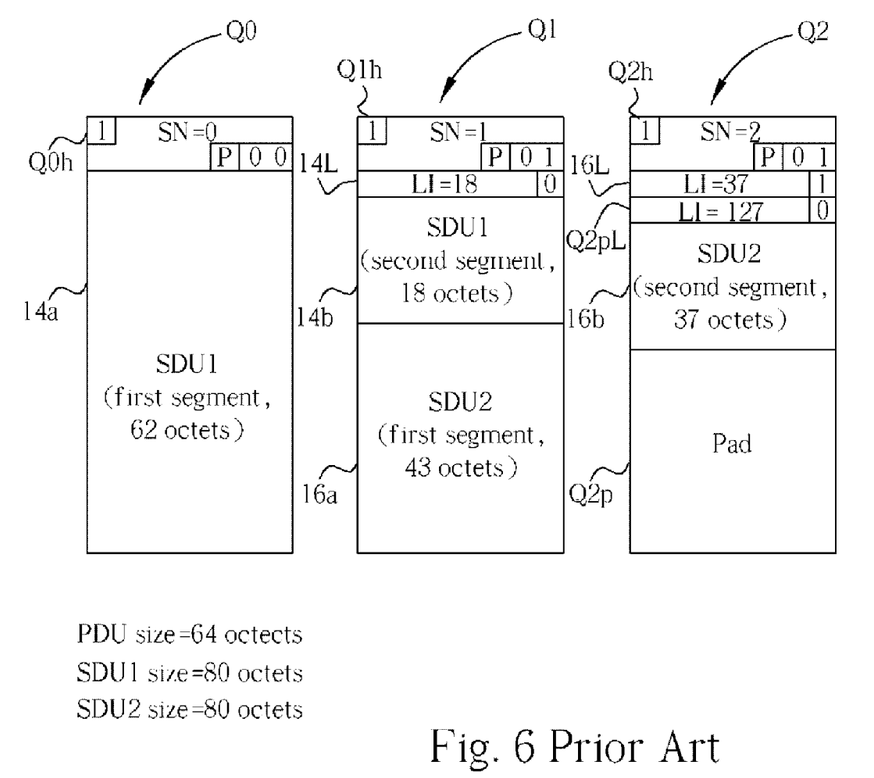
FIG. 6 is a data block diagram showing a typical segmentation of SDUs where concatenation of SDU segments is used.

Please refer to FIG. 6, which illustrates another typical sequence of PDUs containing SDUs. In this example, two SDUs, SDU1 and SDU2, each of length 80 octets are packetized into three PDUs Q0, Q1, Q2 each of length 64 octets. Each PDU contains a header, respectively Q0h, Q1h, Q2h, Q3h, which is two octets long, leaving 62 octets for the contents of the PDUs. PDU Q0 has the SN of zero (0), and the flag indicates that there is no LI. The data 14a is thus entirely from a single SDU SDU1. PDU Q1 has a header Q1h with SN equal to 1 and its flag set to 1 indicating that a LI structure follows the header Q1h. The LI field 14L has a value of 18 followed by a flag set to 0 indicating no more LIs; the first eighteen data octets 14b of this PDU are thus the remainder of SDU1, and the remaining forty-three data octets 16a are from the next SDU, SDU2. PDU Q2 has a header Q2h with SN equal to 2 and its flag set to 1 indicating that a LI structure follows the header Q2h. The Li field 16L has a value of 37 followed by a flag set to 1 indicating another LI follows. The second LI has a value of 127 followed by a flag set to 0 indicating no more LIs. The first thirty-seven data octets 16b of the PDU are the remainder of SDU2, and the remaining octets are padding Q2p to be neglected.

Figure 7:
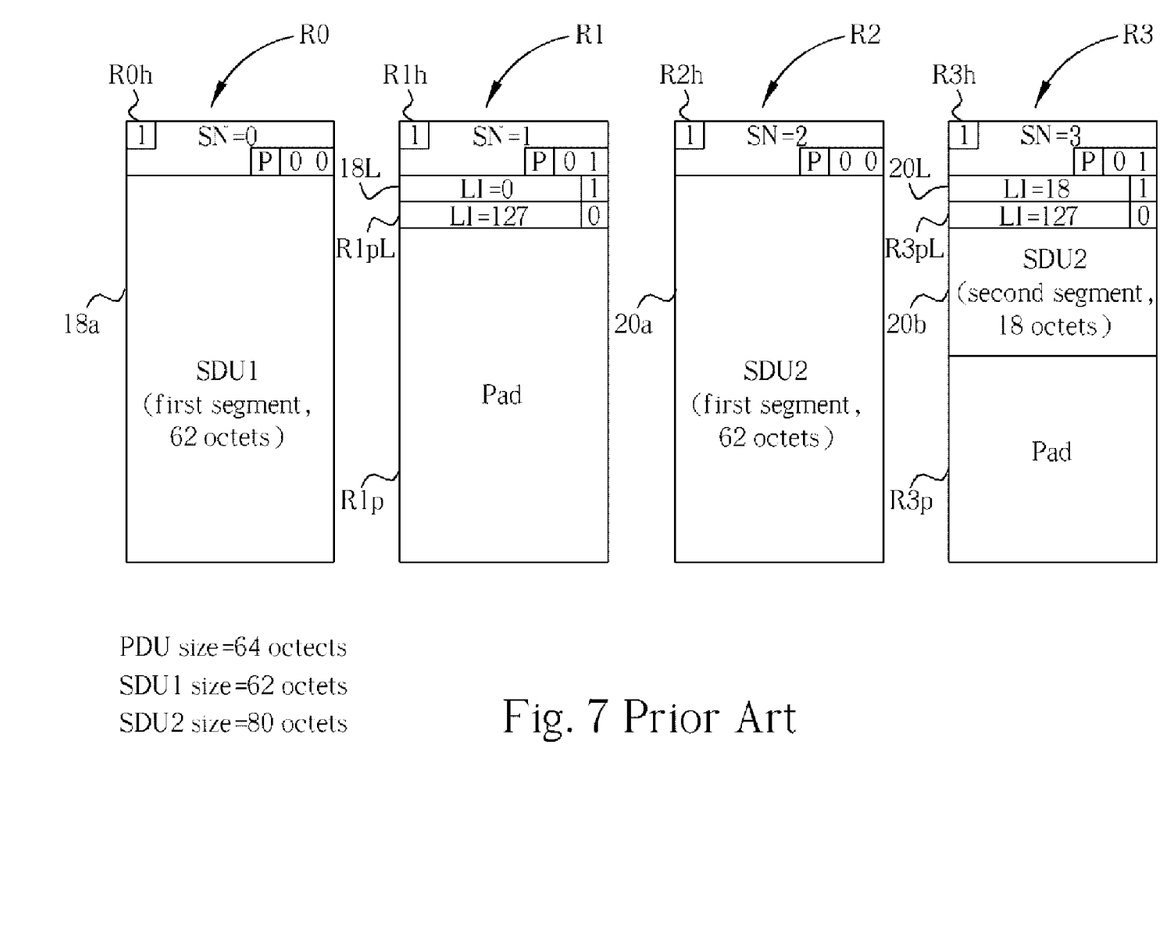
FIG. 7 is a data block diagram showing a second typical segmentation of SDUs where no concatenation of SDU segments is used.

Please refer to FIG. 7, which illustrates a third typical sequence of PDUs containing SDUs. In this example, two SDUs, SDU1 of length 62 octets and SDU2 of length 80 octets, are packetized into four PDUs R0, R1, R2 and R3, each of length 64 octets. Each PDU contains a header, respectively R0h, R1h, R2h, R3h, which is two octets long, leaving 62 octets for the contents of the PDU. PDU R0 has the SN of zero (0), and the flag indicates that there is no LI. The data 18a is thus entirely from a single SDU. PDU R1 has SN equal to 1, and its flag set to 1 indicates that it contains a LI structure. The LI 18L has a value of zero (0) followed by a flag set to 1 indicating another LI to follow; it then has an LI field R1pL with a value of 127 followed by a flag set to 0 indicating that it is the last LI in the PDU. The special value (0) of the first LI indicates that the previous PDU R0 was exactly filled with the last segment of a SDU, SDU1, and there is no LI field that indicates the end of the SDU in the previous PDU R0. Thus, the rest part R1p of PDU R1 is a padding part to be neglected. PDU R2 has the SN of 2, and the flag indicates that there is no LI. The data 20a is thus entirely from a single SDU, SDU2. PDU R3 has a header R3h with SN of 3 and its flag set to 1 indicating that a LI structure follows the header R2h. The LI field 20L has a value of 18 followed by a flag set to 1 indicating another LI to follow; it then has an LI field R3pI with a value of 127 followed by a flag set to 0 indicating that there are no further LI fields. Thus, the first eighteen data bytes of this PDU, following the two LI structures, are the remainder of the data 20b for SDU2. The remaining part R3p of this PDU is padding to be neglected.

Figure 2:
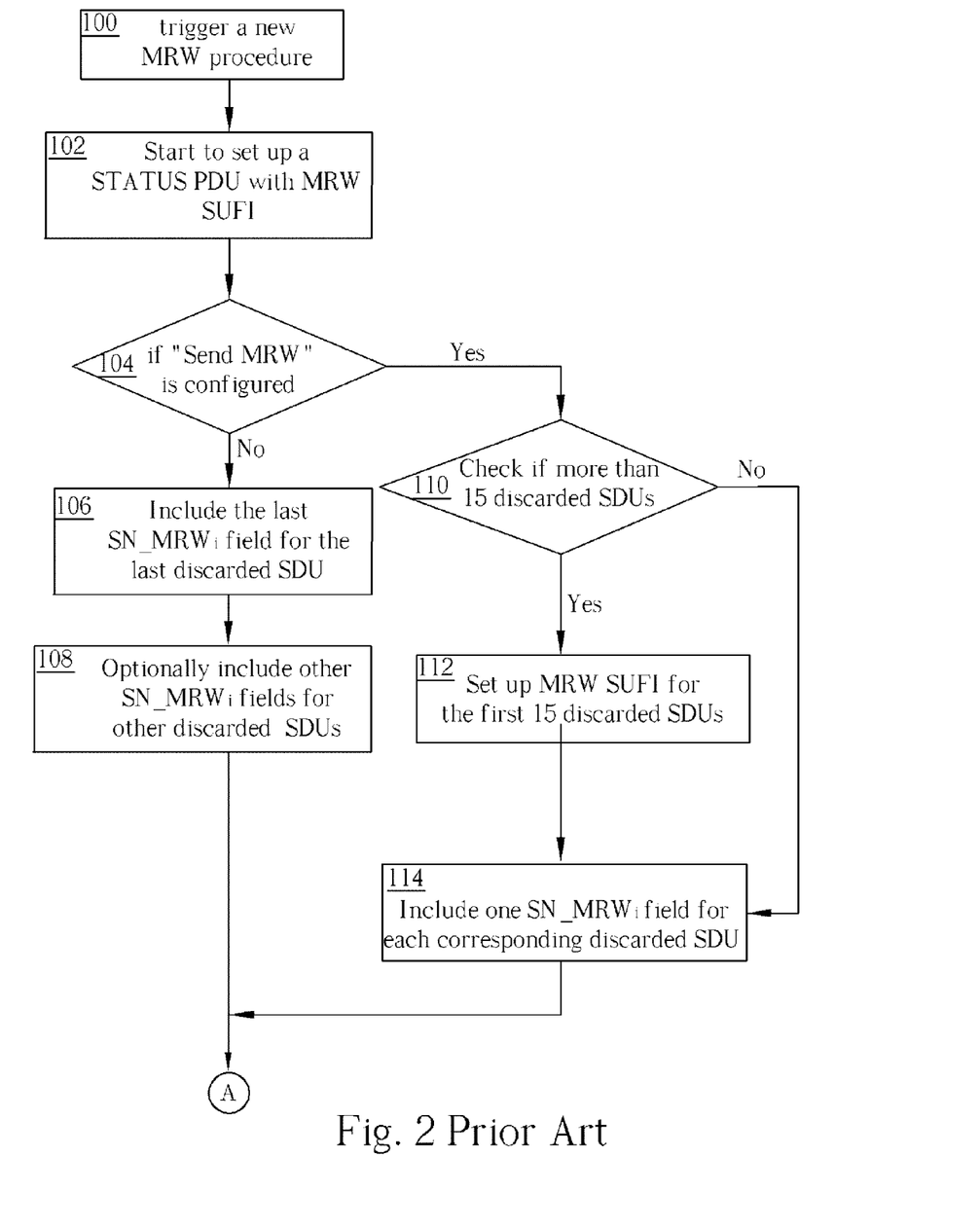
FIG. 2 is a flowchart of a prior-art SDU discard method.

In the prior art, the method for discarding an SDU is as follows. Please refer to FIG. 2, FIG. 3, and FIG. 4, which are flowcharts of the prior art method of discarding SDUs. These steps are explained below:

Step 100: Trigger a new Move Receiving Window (MRW) procedure. The sender indicates that at least one SDU is to be discarded.

Step 102: Set up a STATUS PDU with a MRW superfield (SUFI). Create a PDU structure and populate its basic fields.

Step 104: Determine whether "send MRW" is configured for this RLC entity. When true, proceed to step 110. When not true, proceed to step 106.

Step 106: Set the STATUS PDU to include the last SN_MRW$_i$ field for the last discarded SDU.

Step 108: Optionally set the STATUS PDU to include other SN_MRW$_i$ fields for other discarded SDUs, and proceed to step 116 (marked by "A", in FIG. 3).

Step 110: Check whether there are more than 15 discarded SDUs, which is the largest number of SDU SN_MRW$_i$ fields that can fit in the STATUS PDU. When more than fifteen SDUs are being discarded, proceed to step 112. When fifteen or fewer SDUs are being discarded, proceed to step 114.

Step 112: Set up the MRW SUFI for the first fifteen discarded SDUs.

Step 114: Include one SN_MRW$_i$ field for each corresponding discarded SDU. Proceed to step 116 (marked by "A", in FIG. 3).

Figure 3:
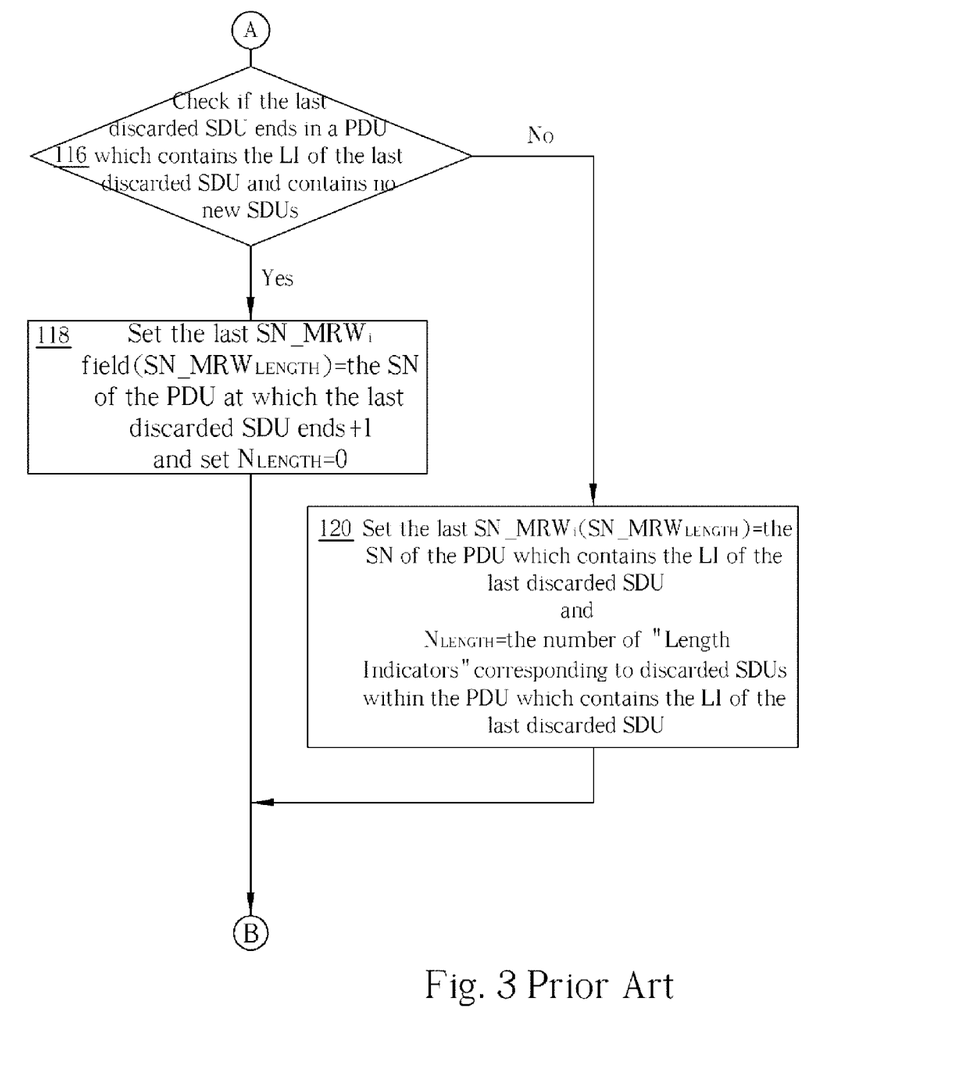
FIG. 3 is a flowchart of a prior-art SDU discard method.

Step 116: Check whether the last discarded SDU ends in a PDU which contains the LI of the last discarded SDU and contains no new SDUs. When true, proceed to step 118. When false, proceed to step 120.

Step 118: Set the last SN_MRW$_i$ field (SN_MRW$_{LENGTH}$) to be the sum of one plus the SN of the PDU at which the last discarded SDU ends, and set N$_{LENGTH}$ to zero. Proceed to step 122 (marked by "B" in FIG. 4).

Step 120: Set the last SN_MRW$_i$ field (SN_MRW$_{LENGTH}$) to be the SN of the PDU which contains the LI of the last discarded SDU, and set N$_{LENGTH}$ to be the number of LIs corresponding to discarded SDUs within the PDU which contains the LI of the last discarded SDU. Proceed to step 122 (marked by "B" in FIG. 4).

Figure 4:
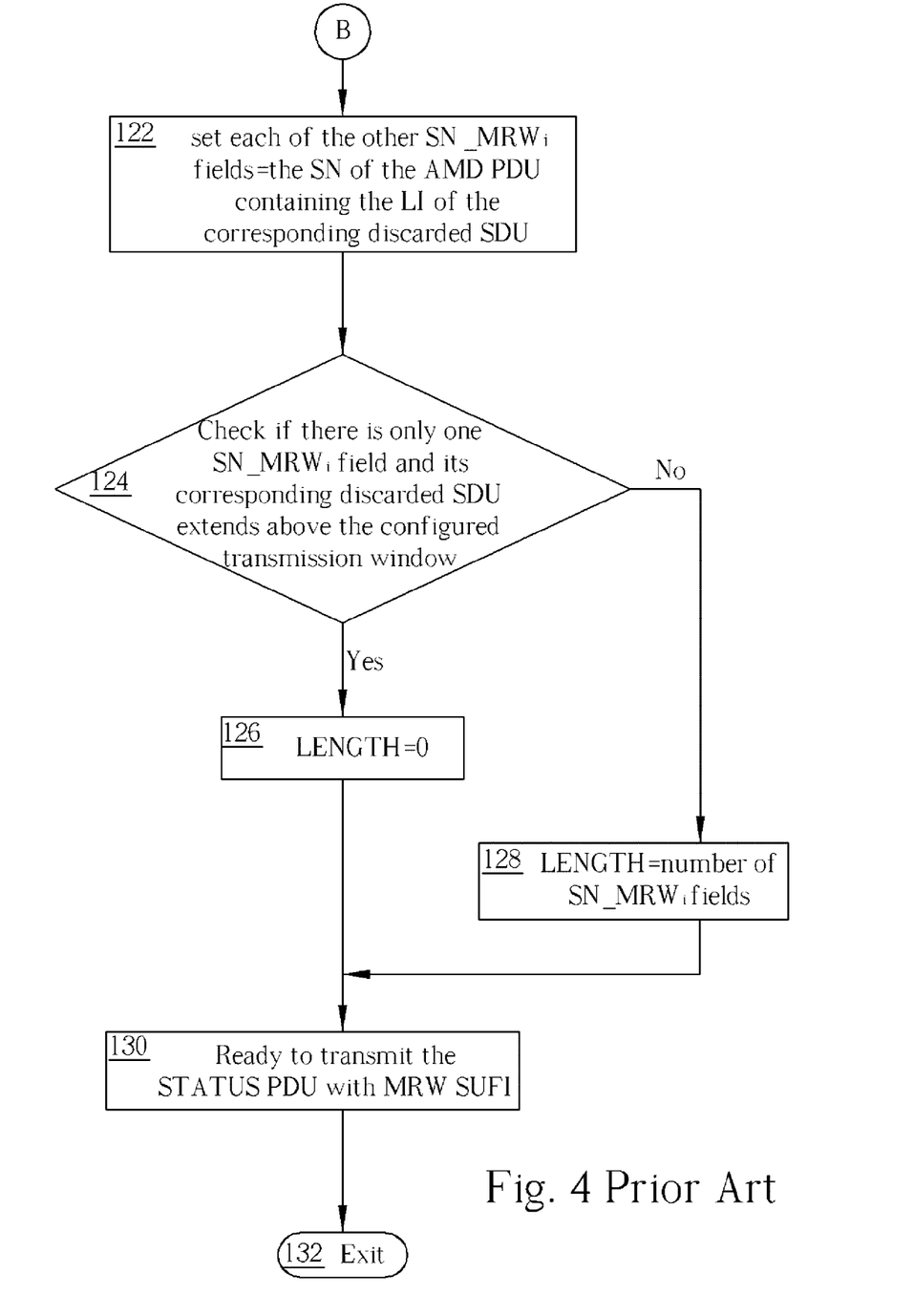
FIG. 4 is a flowchart of a prior-art SDU discard method.

Step 122: Set each of the other SN_MRW$_i$ fields to be the SN of the AMD PDU containing the LI of the corresponding discarded SDU Step 124: Check whether there is only one SN_MRW$_i$ field and if its corresponding discarded SDU extends above the configured transmission window. When true, proceed to step 126. When false, proceed to step 128.

Step 126: Set LENGTH to zero, and proceed to step 130.

Step 128: Set LENGTH to the number of SN_MRW$_i$ fields, and proceed to step 130.

Step 130: Submit the STATUS PDU with MRW SUF1 for transmission.

Step 132: Finish (exit procedure).

please refer to FIG. 5 with regard to the above steps, as well as FIG. 2, FIG. 3, and FIG. 4. When an SDU discard procedure is initiated to discard SDU1, a MRW procedure is triggered at step 100 (shown in FIG. 2). The method sets up a STATUS PDU with MRW SUF1 in step 102. Since only one SDU is being discarded, the method will produce the same results whether step 104 chooses to go to step 106 or step 110. When "Send MRW" is not configured, step 106 includes the SN_MRW$_1$ field in the MRW SUFI for SDU1, and step 108 is ignored since there are no more SDUs being discarded. When "Send MRW" is configured, step 110 proceeds to step 114 since only one SDU is being discarded, and step 114 includes the SN_MRW$_1$ field in the MRW SUFI for SDU1. Both paths then converge again at step 116 (shown in FIG. 3). In step 116, the last discarded SDU, SDU1, ends in PDU P1, and PDU P1 contains the LI 10L, and contains no new SDUs after SDU1 since its remainder is filled with padding P1p. Therefore, the method proceeds to step 118, where the last SN_MRW$_i$ field, SN_MRW$_{LENGTH}$, is set to the sum of one plus the SN of PDU P1, or the value 2, since PDU P1 has an SN of 1. The method then proceeds to step 122 (shown in FIG. 4), where since there are no more discarded SDUs, nothing is done. At step 124, depending on the actual position of the transmission window, the method either goes to step 126 or step 128, where the LENGTH field of the MRW SUFI is filled in with either the value 0 or the value 1 respectively. Finally, at step 130, the method is ready to transmit the just-created STATUS PDU with MRW SUFI, and the method finishes at step 132.

Next, please refer to FIG. 6 with regard to the above steps, as well as FIG. 2, FIG. 3, and FIG. 4. When an SDU discard procedure is initiated to discard SDU1, a MRW procedure is triggered at step 100 (shown in FIG. 2). The method sets up a STATUS PDU with MRW SUFI in step 102. Since only one SDU is being discarded, the method will produce the same results whether step 104 chooses to go to step 106 or step 110. When "Send MRW" is not configured, step 106 includes the SN_MRW$_1$ field in the MRW SUFI for SDU1, and step 108 is ignored since there are no more SDUs being discarded. When "Send MRW" is configured, step 110 proceeds to step 114 since only one SDU is being discarded, and step 114 includes the SN_MRW$_1$ field in the MRW SUFI for SDU1. Both paths then converge again at step 116 (shown in FIG. 3). In step 116, the last discarded SDU, SDU1, ends in PDU Q1, and PDU Q1 contains the LI 14L, and contains a new SDU, SDU2, which has its first data segment 16a. Therefore, the method proceeds to step 120, where the last SN_MRW$_i$ field, SN_MRW$_{LENGTH}$, is set to the SN of PDU Q1, or the value 1, since PDU Q1 has an SN of 1. The method then proceeds to step 122 (shown in FIG. 4), where since there are no more discarded SDUs, nothing is done. At step 124, depending on the actual position of the transmission window, the method either goes to step 126 or step 128, where the LENGTH field of the MRW SUFI is filled in with either the value 0 or the value 1 respectively. Finally, at step 130, the method is ready to transmit the just-created STATUS PDU with MRW SUFI, and the method finishes at step 132.

For a third example, please refer to FIG. 7 with regard to the above steps, as well as FIG. 2, FIG. 3, and FIG. 4. When an SDU discard procedure is initiated to discard SDU1, a MRW procedure is triggered at step 100 (shown in FIG. 2). The method sets up a STATUS PDU with MRW SUFI in step 102. Since only one SDU is being discarded, the method will produce the same results whether step 104 chooses to go to step 106 or step 110. When "Send MRW" is not configured, step 106 includes the SN_MRW$_1$ field in the MRW SUFI for SDU1, and step 108 is ignored since there are no more SDUs being discarded. When "Send MRW" is configured, step 110 proceeds to step 114 since only one SDU is being discarded, and step 114 includes the SN_MRW$_1$ field in the MRW SUFI for SDU1. Both paths then converge again at step 116 (shown in FIG. 3). In step 116, the last discarded SDU, SDU1, ends in PDU R0, which does not contains the LI 18L of the last discarded SDU, SDU1. Therefore, the method proceeds to step 120, where the last SN_MRW$_i$ field, SN_MRW$_{LENGTH}$, is set to the SN of PDU R1 which contains the LI 18L of the last discarded SDU, SDU1, or the value 1, since PDU R1 has an SN of 1. The method then proceeds to step 122 (shown in FIG. 4), where since there are no more discarded SDUs, nothing is done. At step 124, depending on the actual position of the transmission window, the method either goes to step 126 or step 128, where the LENGTH field of the MRW SUFI is filled in with either the value 0 or the value 1 respectively. Finally, at step 130, the method is ready to transmit the just-created STATUS PDU with MRW SUFI, and the method finishes at step 132.

The current method therefore incorrectly sets the MRW SUFI to discard PDU R0 only, moving the receiving window to start at PDU R1. The receiving station or the second station 400 in FIG. 1 will wait to receive PDU R1, which is discarded in the transmitting station or the first station 300 in FIG. 1. A reset procedure will be initiated later.

As seen in the third example, a key problem of this method is that it sometimes fails to discard a PDU when it should. This causes a reset procedure to be triggered occasionally in the normal course of discarding SDUs. As these reset procedures waste potentially large amounts of bandwidth, an improved method for discarding SDUs is clearly necessary.

SUMMARY OF THE INVENTION

It is therefore a primary objective of the claimed invention to provide a method for handling an SDU discard procedure to eliminate the risk of unnecessary reset procedures due to erroneous SDU discard procedure.

Briefly summarized, the claimed invention is a method for handling discarding of a sequence of service data units in a communications system, the sequence of service data units comprising at least a last discarded service data unit (SDU), the method comprising the following steps: when a protocol data unit (PDU) containing a length indicator of the last discarded SDU contains no new SDUs: creating a move receiving window super field (MRW SUFI), setting a N$_{LENGTH}$ field of the MRW SUFI to 0, setting a last sequence number move receiving window field (SN_MRW$_{LENGTH}$) to a sum of one plus a sequence number (SN) of the PDU containing the length indicator of the last discarded SDU, and issuing the MRW SUFI.

These and other objectives of the present invention will no doubt become obvious to those of ordinary skill in the art after reading the following detailed description of the preferred embodiment that is illustrated in the various figures and drawings.

DETAILED DESCRIPTION

Figure 8:
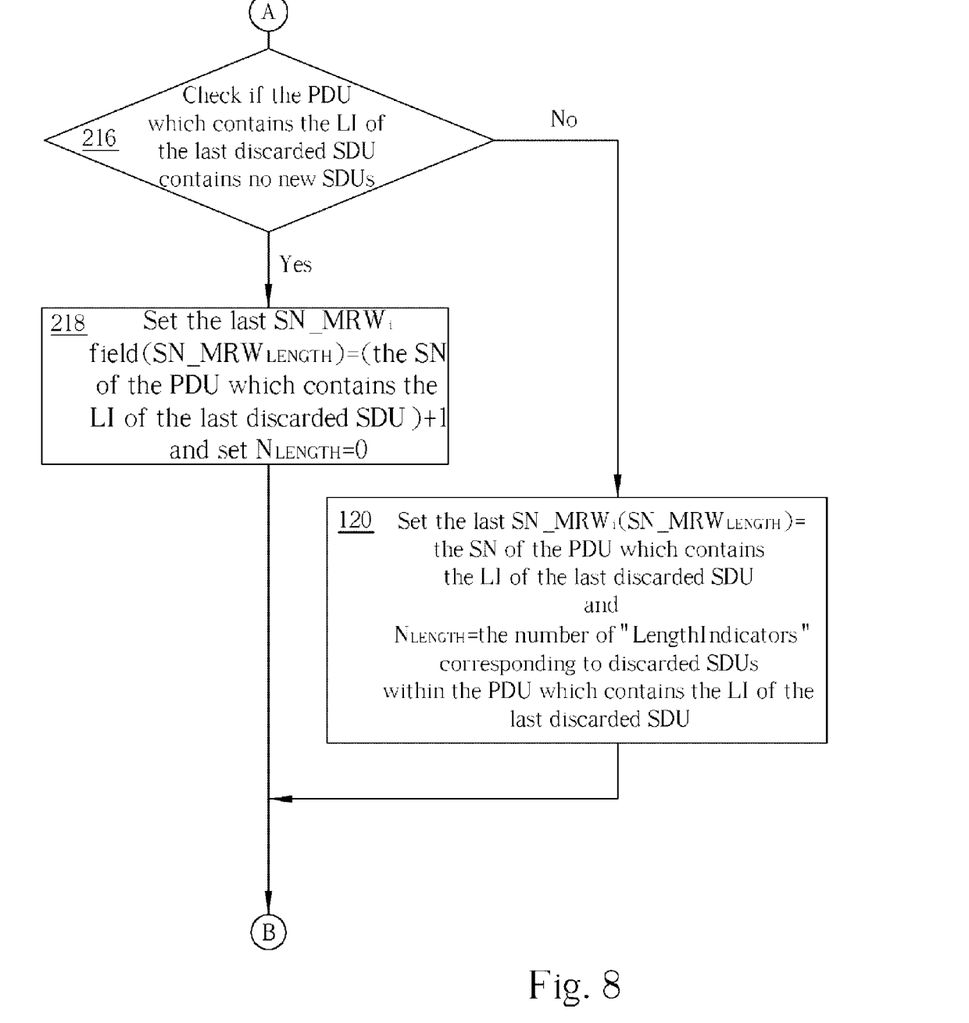
FIG. 8 is a flowchart of the enhanced SDU discard method.

Please refer to FIG. 2, FIG. 8, and FIG. 4, which are flowcharts showing the method of the present invention (FIG. 8) in combination with portions of the method of the prior art (FIG. 2 and FIG. 4). Please note that prior art steps 116 and 118 are replaced herein with steps 216 and 218.

Step 100: Trigger a new Move Receiving Window (MRW) procedure. The sender indicates that at least one SDU is to be discarded.

Step 102: Set up a STATUS PDU with a MRW superfield (SUFI). Create a PDU structure and populate its basic fields.

Step 104: Determine whether "send MRW" is configured for this RLC entity. When true, proceed to step 110. When not true, proceed to step 106.

Step 106: Set the STATUS PDU to include the last SN_MRW$_i$ field for the last discarded SDU.

Step 108: Optionally set the STATUS PDU to include other SN_MRW$_i$ fields for the other discarded SDUs, and proceed to step 216 (marked by "A", in FIG. 8).

Step 110: Check whether there are more than 15 discarded SDUs, which is the largest number of SDU SN_MRW$_i$ fields that can fit in the STATUS PDU. When more than fifteen SDUs are being discarded, proceed to step 112. When fifteen or fewer SDUs are being discarded, proceed to step 114.

Step 112: Set up the MRW SUFI for the first fifteen discarded SDUs.

Step 114: Include one SN_MRW$_i$ field for each corresponding discarded SDU. Proceed to step 216 (marked by "A", in FIG. 8).

Step 216: Check whether the PDU containing the LI of the last discarded SDU contains no new SDUs. When true, proceed to step 218. When false, proceed to step 120.

Step 218: Set the last SN_MRW$_i$ field (SN_MRW$_{LENGTH}$) to be the sum of one plus the SN of the PDU which contains the LI of the last discarded SDU, and set N$_{LENGTH}$ to zero. Proceed to step 122 (marked by "B" in FIG. 4).

Step 120: Set the last SN_MRW$_i$ field (SN_MRW$_{LENGTH}$) to be the SN of the PDU which contains the LI of the last discarded SDU, and set N$_{LENGTH}$ to be the number of LIs corresponding to discarded SDUs within the PDU which contains the LI of the last discarded SDU. Proceed to step 122 (marked by "B" in FIG. 4).

Step 122: Set each of the other SN_MRW$_i$ fields to be the SN of the AMD PDU containing the LI of the corresponding discarded SDU Step 124: Check whether there is only one SN_MRW$_i$ field and if its corresponding discarded SDU extends above the configured transmission window. When true, proceed to step 126. When false, proceed to step 128.

Step 126: Set LENGTH to zero, and proceed to step 130.

Step 128: Set LENGTH to the number of SN_MRW$_i$ fields, and proceed to step 130.

Step 130: Submit the STATUS PDU with MRW SUFI for transmission.

Step 132: Finish (exit procedure).

Please refer to FIG. 5 with regard to the above steps, as well as FIG. 2, FIG. 8, and FIG. 4. When an SDU discard procedure is initiated to discard SDU1, a MRW procedure is triggered at step 100 (shown in FIG. 2). The method sets up a STATUS PDU with MRW SUFI in step 102. Since only one SDU is being discarded, the method will produce the same results whether step 104 chooses to go to step 106 or step 110. When "Send MRW" is not configured, step 106 includes the SN_MRW1 field in the MRW SUFI for SDU1, and step 108 is ignored since there are no more SDUs being discarded. When "Send MRW" is configured, step 110 proceeds to step 114 since only one SDU is being discarded, and step 114 includes the SN_MRW1 field in the MRW SUFI for SDU1. Both paths then converge again at step 216 (shown in FIG. 8). In step 216, PDU P1 contains the LI 10L of the last discarded SDU, SDU1, and contains no new SDUs after SDU1 since its remainder is filled with padding P1$p$. Therefore, the method proceeds to step 218, where the last SN_MRW$_i$ field, SN_MRW$_{LENGTH}$, is set to the sum of one plus the SN of PDU P1, or the value 2, since PDU P1 has an SN of 1. The method then proceeds to step 122 (shown in FIG. 4), where since there are no more discarded SDUs, nothing is done. At step 124, depending on the actual position of the transmission window, the method either goes to step 126 or step 128, where the LENGTH field of the MRW SUFI is filled in with either the value 0 or the value 1 respectively. Finally, at step 130, the method is ready to transmit the just-created STATUS PDU with MRW SUFI, and the method finishes at step 132.

Next, please refer to FIG. 6 with regard to the above steps, as well as FIG. 2, FIG. 8, and FIG. 4. When an SDU discard procedure is initiated to discard SDU1, a MRW procedure is triggered at step 100 (shown in FIG. 2). The method sets up a STATUS PDU with MRW SUFI in step 102. Since only one SDU is being discarded, the method will produce the same results whether step 104 chooses to go to step 106 or step 110. When "Send MRW" is not configured, step 106 includes the SN_MRW1 field in the MRW SUFI for SDU1, and step 108 is ignored since there are no more SDUs being discarded. When "Send MRW" is configured, step 110 proceeds to step 114 since only one SDU is being discarded, and step 114 includes the SN_MRW1 field in the MRW SUFI for SDU1. Both paths then converge again at step 216 (shown in FIG. 8). In step 216, PDU Q1 contains the LI 14L of the last discarded SDU, SDU1, and contains a new SDU, SDU2, which has its first data segment 16$a$. Therefore, the method proceeds to step 120, where the last SN_MRW$_i$ field, SN_MRW$_{LENGTH}$, is set to the SN of PDU Q1, or the value 1, since PDU Q1 has an SN of 1. The method then proceeds to step 122 (shown in FIG. 4), where since there are no more discarded SDUs, nothing is done. At step 124, depending on the actual position of the transmission window, the method either goes to step 126 or step 128, where the LENGTH field of the MRW SUFI is filled in with either the value 0 or the value 1 respectively. Finally, at step 130, the method is ready to transmit the just-created STATUS PDU with MRW SUFI, and the method finishes at step 132.

For a third example, please refer to FIG. 7 with regard to the above steps, as well as FIG. 2, FIG. 8, and FIG. 4. When an SDU discard procedure is initiated to discard SDU1, a MRW procedure is triggered at step 100 (shown in FIG. 2). The method sets up a STATUS PDU with MRW SUFI in step 102. Since only one SDU is being discarded, the method will produce the same results whether step 104 chooses to go to step 106 or step 110. When "Send MRW" is not configured, step 106 includes the SN_MRW$_1$ field in the MRW SUFI for SDU1, and step 108 is ignored since there are no more SDUs being discarded. When "Send MRW" is configured, step 110 proceeds to step 114 since only one SDU is being discarded, and step 114 includes the SN_MRW$_1$ field in the MRW SUFI for SDU1. Both paths then converge again at step 216 (shown in FIG. 8). In step 216, PDU R1 contains the LI 18L of the last discarded SDU, SDU1, and contains no new SDUs after SDU1 since its remainder is filled with padding R1$p$. Therefore, the method proceeds to step 218, where the last SN_MRW$_i$ field, SN_$_{MRWLENGTH}$, is set to the sum of one plus the SN of PDU R1 (which contains the LI of SDU1), or the value 2, since PDU R1 has an SN of 1. Note that the value SN_MRW$_{LENGTH}$ is set to 1 in this scenario by the prior art. The method then proceeds to step 122 (shown in FIG. 4), where since there are no more discarded SDUs, nothing is done. At step 124, depending on the actual position of the transmission window, the method either goes to step 126 or step 128, where the LENGTH field of the MRW SUFI is filled in with either the value 0 or the value 1 respectively. Finally, at step 130, the method is ready to transmit the just-created STATUS PDU with MRW SUFI, and the method finishes at step 132.

This improved method therefore behaves correctly in all cases when discarding SDUs, including the case where the last segment of a SDU ends within a given PDU but the LI for the SDU is in the next PDU, as well as the more common case where the last segment of a SDU ends in the same PDU as the LI for said SDU. In the example shown in FIG. 7, the improved method correctly sets the MRW SUFI to discard PDUs R0 and R1, moving the receiving window to start at PDU R2. In contrast, the prior art incorrectly moves the receiving window to start at PDU R1, thereby initiating a reset procedure later. Thus, the present invention avoids an unnecessary reset procedure and bandwidth is saved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for handling discarding of a sequence of service data units in a communications system, the sequence of service data units comprising at least a last discarded service data unit (SDU), the method comprising the following steps:

when a protocol data unit (PDU) containing a length indicator of the last discarded SDU contains no new SDUs:

creating a move receiving window super field (MRW SUFI);

setting a $N_{LENGTH}$ field of the MRW SUFI to 0;

setting a last sequence number move receiving window field ($SN\_MRW_{LENGTH}$) to a sum of one plus a sequence number (SN) of the PDU containing the length indicator of the last discarded SDU; and issuing the MRW SUFI;

wherein the length indicator indicates an end position of the last discarded SDU; the $SN\_MRW_{LENGTH}$ indicates a sequence number of a PDU that contains a data segment of a SDU right after the last discarded SDU; setting the $N_{LENGTH}$ field of the MRW SUFI to 0 indicates that the last SDU discarded ended in a PDU with sequence number $SN\_MRW_{LENGTH}$-1 and that the first data octet in a PDU with sequence number $SN\_MRW_{LENGTH}$ is the first data octet of the SDU right after the last discarded SDU; and the MRW SUFI is used to signal the information of discarded SDUs.

2. The method of claim 1 wherein the PDU containing the length indicator of the last discarded SDU does not contain a data segment of the last discarded SDU.

3. A communications device implementing the method of claim 1.

4. The communications device of claim 3 further comprising a transmitter and receiver.

5. The communications device of claim 4 being a cellular phone.

6. The communications device of claim 4 being a cellular base station.

7. The communications device of claim 4 being a fixed wireless networking unit.

8. The communications device of claim 4 being a fixed wireless telephone system.

9. A communications device implementing the method of claim 2.

10. The communications device of claim 9 further comprising a transmitter and receiver.

11. The communications device of claim 10 being a cellular phone.

12. The communications device of claim 10 being a cellular base station.

13. The communications device of claim 10 being a fixed wireless networking unit.

14. The communications device of claim 10 being a fixed wireless telephone system.

* * * * *